United States Patent

[11] 3,577,077

[72] Inventors Sylvan A. Walliser;
Claire F. Asquith, Huntsville, Ala.

[21] Appl. No. 783,645
[22] Filed Dec. 13, 1968
[45] Patented May 4, 1971
[73] Assignee The United States of America as represented by the Secretary of the Army

[54] APPARATUS FOR MEASURING THE AMOUNT OF MODULATION RESPONSE TO A DIFFERENTIAL INPUT SIGNAL
7 Claims, 3 Drawing Figs.

[52] U.S. Cl. .......... 324/140
[51] Int. Cl. .......... G01r 7/00
[50] Field of Search .......... 324/140, 68, 140 (R), 40, 123; 328/135

[56] References Cited
UNITED STATES PATENTS

| | | | |
|---|---|---|---|
| 3,096,400 | 7/1963 | Hutchinson .......... | 324/68X |
| 3,135,914 | 6/1964 | Callan et al. .......... | 324/40 |
| 3,170,113 | 2/1965 | Harmon .......... | 324/40X |
| 3,458,824 | 7/1969 | Scully .......... | 324/140(R)X |
| 3,168,708 | 2/1965 | Stuart-Williams et al. ... | 328/135X |

*Primary Examiner*—Alfred E. Smith
*Attorneys*—Edward J. Kelly, Harold W. Hilton, Harry M. Saragovitz and Herbert Berl

ABSTRACT: A modulation meter for comparing the amount of flow in one output port of a gas amplifier with the flow in another output port of the amplifier. An input signal is fed from the output ports by way of a differential pressure transducer to the meter where a high impedance buffer stage responds to the signal to activate a high gain stage. The input signal response is coupled through the gain stage and an impedance matching or buffer stage to a differential amplifier. The differential amplifier responds to signal changes by varying the current controlled to a load meter that indicates the gas flow. All stages are transistorized and the differential amplifier has an emitter follower output circuit that prevents loading of the differential amplifier by the meter.

Sylvan A. Walliser
Claire F. Asquith,
INVENTORS.

BY Harry M. Saragovitz
Edward J. Kelly
Herbert Berl
Harold W. Hilton

Sylvan A. Walliser
Claire F. Asquith,
INVENTORS.
BY Harry M. Saragovitz
Edward J. Kelly
Herbert Berl
Harold W. Hilton

APPARATUS FOR MEASURING THE AMOUNT OF MODULATION RESPONSE TO A DIFFERENTIAL INPUT SIGNAL

SUMMARY OF THE INVENTION

The apparatus of the present invention is a percentage modulation meter that is responsive to a differential input signal. A receiving means is operably responsive to the input signal and provides a varying output voltage level that switches an electronic switching circuit between a conductive and a nonconductive state. The state of said switching circuit causes a corresponding response in a differential amplifier. The amplifier response to the switching circuit results in current being fed to an indicating circuit for indication thereof. The current pulses supplied to the indicating circuit are indicative of the original input signal and are time averaged within the indicating circuit prior to display.

DESCRIPTION OF THE PREFERRED EMBODIMENT

Figure 1:
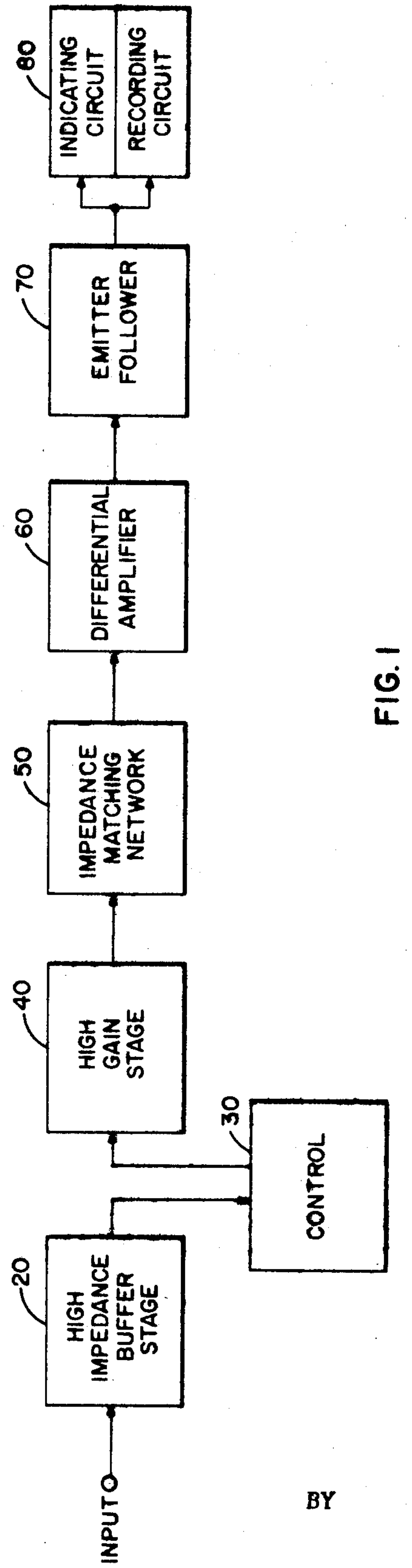
FIG. 1 is a block diagram of the modulation meter.

Referring now to the drawings, FIG. 1 discloses a block diagram of the present invention. An input signal is brought into a high impedance isolation stage 20, is coupled through a resistive control 30, and fed to a high gain stage 40. An output signal from stage 40 is fed to an impedance matching network 50 and coupled to a differential amplifier stage 60. An output signal from the differential amplifier 60 is connected to an emitter follower 70 that serves as a buffer for amplifier 60. The emitter follower 70 has an output connected to an indicating and recording circuit 80.

Figure 2:
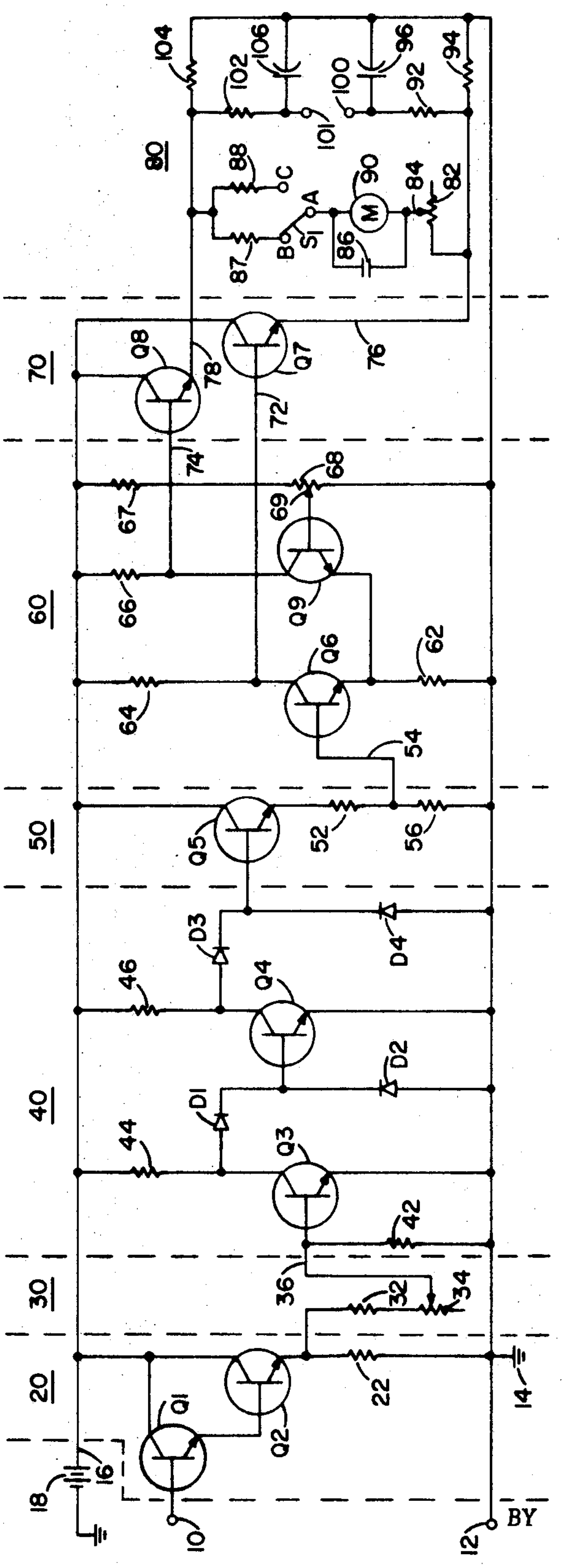
FIG. 2 is a circuit diagram of the modulation meter.

The various stages of the modulation meter are interconnected as shown in FIG. 2. Isolation stage 20 includes two transistors, $Q_1$ and $Q_2$, connected to provide a high impedance to an input signal. An input terminal 10 is connected to the base of transistor $Q_1$; and the emitter of $Q_1$ is connected to the base of $Q_2$. The collectors of $Q_1$ and $Q_2$ are connected in parallel to the positive side 16 of a power source 18. The emitter of $Q_2$ is connected through a resistor 22 to a common input terminal 12 that is connected to ground 14. A signal applied to terminal 10 will activate $Q_1$, which in turn activates $Q_2$. The impedance 22 causes the signal on the emitter of $Q_2$ to be coupled to resistive control 30. Control 30 includes a resistor 32 connected between the emitter of $Q_2$ and a variable resistance 34. The resistance 34 controls the signal level that is applied to gain stage 40.

In gain stage 40 an input signal is applied to the base of $Q_3$. Transistor $Q_3$ has the base thereof connected to the variable tap 36 of resistance 34 and also connected through a resistor 42 to ground 14. A diode $D_1$ is connected in the forward direction between the collector of $Q_3$ and the base of a second transistor $Q_4$, the anode of diode $D_1$ being connected to the collector of $Q_3$. the emitters of $Q_3$ and $Q_4$ are connected to ground and the collectors are connected through resistors 44 and 46 respectively, to the positive side of power source 18. A diode $D_2$ has the anode thereof connected to ground and the cathode connected to the base of $Q_4$. A diode $D_3$ has the anode thereof connected to the collector of $Q_4$ and the cathode connected to the cathode of another diode $D_4$, the anode of $D_4$ being connected to ground 14. An output from the cathode of $D_3$ is connected as input to the impedance matching network 50.

Impedance matching stage 50 includes a single transistor $Q_5$ which responds to the output of stage 40 and activates differential amplifier 60 without undue circuit loading. The collector of $Q_5$ is connected to the positive source 16, and the emitter of $Q_5$ is connected through a resistor 52 to an output lead 54 that serves as an input to amplifier 60. Resistor 52 and lead 54 also connect through a resistor 56 to ground. Resistors 52 and 56 serve as a voltage divider input to the base of transistor $Q_6$ of differential amplifier 60. The emitter and collector of $Q_6$ are respectively connected through resistors 62 and 64 to ground and power source 18. Another transistor $Q_9$ has the emitter thereof connected to the emitter of $Q_6$ and the collector connected through a resistor 66 to power source 18. A resistor 67 is series connected with a variable resistance 68 between positive source 16 and ground 14 to provide an easily adjustable voltage by way of tap 69 to the base of $Q_9$.

Emitter follower 70 includes two transistors, $Q_7$ and $Q_8$, having their respective collectors connected to power source 18. An input signal is received over lead 72 from the collector of $Q_6$ to the base of $Q_7$; similarly, a lead-in 74 connects the base of $Q_8$ to the collector of $Q_9$. The emitters of $Q_7$ and $Q_8$ are connected to the indicating and recording circuit 80 by output leads 76 and 78 respectively. In circuit 80 a variable resistance 82 has one side connected to lead 76 and a tap 84 connected to one side of a meter 90. Meter 90 has a capacitor 86 bridging it and is connected on the other side to the movable contact A of a single-pole switch $S_1$. contact A can be manually connected to fixed terminals B or C. Terminal B is connected through a resistor 87 to lead 78 and terminal C is connected through a resistor 88 to lead 78. These elements that are in series with meter 90 between leads 76 and 78 determined the sensitivity of the meter. Lead 76 further connects the emitter of $Q_7$ to resistors 92 and 94. Resistor 94 is connected to ground and resistor 92 is connected to an output terminal 100 and through a capacitor 96 to ground. Similarly, lead 78 is connected through a resistor 104 to ground, and through a resistor 102 to an output terminal 101, terminal 101 being connected through a capacitor 106 to ground 14. The signals applied to output terminals 100 and 101 are applied to a recorder (not shown) and simultaneously record the output that is indicated on meter 90.

Figure 3:
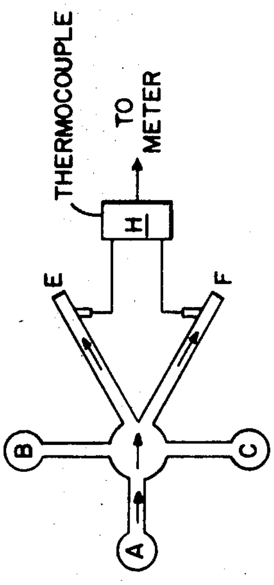
FIG. 3 is a flow diagram of a gas amplifier.

FIG. 3 is a flow diagram of a gas amplifier having a supply port A that feeds the gas into output ports E and F. A stream of air or gas from port A splits and divides into ports E and F. A pressure or vacuum applied to ports B or C acts upon the supply stream to direct it into port E or F accordingly, in a manner well known in the fluid amplifier art. The control pressure may be a small portion of the supply pressure and may vary with time. The gas exhausted at ports E and F may be used to drive another amplifier, or may be exhausted to provide a reaction thrust vector. A gas amplifier can be adjusted in both gain and bias. The operation of the gas amplifier is determined by use of a pressure gauge or manometer that monitors each of the control and output ports, or a differential pressure transducer H, as shown in FIG. 3, may be used.

The modulation meter can be used to measure and indicate the percentage of modulation or variations in the gas amplifier shown in FIG. 3. Similarly, the meter may be used with any input circuitry that provides a differential output to the meter. For example, temperature variations about a critical point in or between mediums can be monitored. For illustrative purposes, the signals applied to the modulation meter of FIG. 2 are received from the gas amplifier of FIG. 3.

A differential pressure as sensed by transducer H is fed to modulation meter input terminals 10 and 12. Either one of the output ports may be selected for connection to the wiper or active arm of the transducer and the signal from this arm is applied to input terminal 10. The other output port signal is passed to terminal 12. The variation of gas flowing in the output ports E and F, as modulated by the control ports B or C, causes periodic conduction of transistors $Q_1$ and $Q_2$ and a current to flow through resistor 34. Resistor 34 provides biasing for $Q_3$ and determines the operating point thereof. When the signal at the base of $Q_3$ is below cutoff, $Q_3$, $Q_5$, and $Q_6$ are not conducting and $Q_4$, $Q_7$, $Q_8$, and $Q_9$ are conducting. Meter 90 is indicating a strong current flow from the emitter of $Q_7$ which overcomes or neutralizes a weaker signal from the emitter of $Q_8$. A graphic recorder such as an X–Y recorder or an oscilloscope connected to output terminals 100 and 101 can indicate the signals for recording or detailed observations. These two visible displays are indicative of the percentage of modulation, the amount of gas flowing in one output port with respect to the other port.

When the differential pressure increases to the point where the voltage on the base of $Q_3$ causes $Q_3$ to switch on, there is an instantaneous reversal of state between $Q_3$ and $Q_4$. Transistor $Q_3$ activates or becomes conductive and $Q_4$ becomes nonconductive due to the effective grounding of the base of $Q_4$ through the emitter-collector of $Q_3$ and diode $D_1$. The reverse effect occurs simultaneously with $Q_5$, ground being removed from the base thereof and positive power being supplied from source 18 through resistor 46. Transistor $Q_5$ conducts, thereby activating $Q_6$ which causes the potential on the base of $Q_7$ to drop toward ground resulting in reduced current flow through the emitter follower circuit of $Q_7$. The effective voltage across resistor 62 increases with current flow through $Q_6$ thereby raising the potential on the emitter of $Q_9$. Transistor $Q_9$ is normally maintained in a state of conduction by the fixed bias on the base thereof. The bias is supplied through variable resistor 68 which, when adjusted, provides the zero adjustment for meter 90. When the emitter voltage of $Q_9$ is increased, conduction is decreased therethrough and the resulting increase of voltage on the base of $Q_8$ increases conduction therein. The original situation is now reversed, with meter 90 indicating a strong current flow from the emitter of $Q_8$ which overcomes a weaker signal from the emitter of $Q_7$, to cause a change in the indication of meter 90.

With no input signal, meter 90 would indicate a maximum gas flow in one output port, for example, port F. This could be represented by the meter indicating all the way to the left side thereof. With a maximum signal, such as that received with terminal 10 strapped to positive lead 16, the meter would indicate maximum gas flow in port E by indicating to the right side of the meter. With equal flow in both output ports the meter would indicate zero deviation and current flowing through the meter from both sides would be equal. Under normal conditions, neither of the two extreme conditions will be recorded. Constant modulation of the gas flow and the slow response of the modulation meter will keep the meter 90 indicating the time averaged gas flow. The rapid on-off action of $Q_6$ and $Q_7$ coupled with the response of $Q_9$ and $Q_8$ will keep the indicator of meter 90 varying around the particular percentage modulation point established by the input control ports B and C.

Due to the circuit components response time to an input signal the response time of the circuit is limited only by the meter 90. The PDM, pulse-duration modulation, level takes place in the meter movement. Capacitors 96 and 106, along with resistors 92 and 102, convert the PDM wave to a direct current for display of modulation percentage on the recorder.

The circuit of the invention has been successfully operated with the following circuit values:

| | | |
|---|---|---|
| Transistors $Q_1$–$Q_9$ | | 2N335 |
| Diodes $D_1$–$D_4$ | | 1N2070 |
| Resistors 22 and 32 | kilohms | 4.7 |
| Resistors 34, 42, 64, 66, and 67 | do | 10 |
| Resistor 44 | do | 47 |
| Resistors 46, 92, and 102 | do | 22 |
| Resistors 52, 56, 62, 94, and 104 | do | 2.7 |
| Resistor 82 | do | 100 |
| Resistor 87 | do | 150 |
| Resistor 88 | do | 50 |
| Resistor 68 | do | 5 |
| Capacitors 96 and 106 | microfarads | 10 |
| Capacitors 86 | do | 50 |
| Meter 90 (movement) | microampere | 50–0–50 |

Although a particular embodiment and form of this invention has been illustrated, it obvious to those skilled in the art that modifications may be made without departing from the scope and spirit of the foregoing disclosure. Therefore, it is understood that the invention is limited only by the claims appended hereto.

We claim:

1. A modulation meter for comparing the variations of a differential input signal comprising receiving means having an input and an output that is operably responsive to an input signal for providing a varying output voltage level; electronic switching means having an input and an output and that is responsive to the output of said receiving means to alternate between a conductive and a nonconductive output state; differential means having a first input and first and second outputs, said first input being responsive to the state of said electronic switching means for providing a first output signal when said switching means is conductive and a second output signal when said switching means is nonconductive; emitter follower means having first and second continuous output currents, said emitter follower means being responsive to said first and second differential output signals for varying said output currents; and indicating means connected across the outputs of said emitter-follower means for monitoring and indication the differential of the opposing currents passed therethrough.

2. A modulation meter as set forth in claim 1 wherein said receiving means includes a pair of transistors having an input and output, said input being operably responsive to activate said transistor pair, said output having a voltage level determined by the current flow through said transistors, and further comprising a variable resistive control connected to the output of said transistor pair for adjusting said output voltage level.

3. A modulation meter as set forth in claim 2 wherein said switching means includes cascaded transistor stages having alternate stages nonconductive when preceding stages are conductive and vice versa, said differential means is a differential amplifier having first and second inputs, said first input being responsive to the output of said switching means, and said second input being fixed with an adjustable bias for maintaining constant conduction therein.

4. A modulation meter as set forth in claim 3 wherein said emitter follower means includes first and second emitter follower transistors, said first emitter follower transistor having a dominant output when said switching output is nonconductive, said second emitter follower transistor having a dominant output when said switching output is conductive, and wherein said indicating means includes a meter circuit connected as an output load to said emitter follower transistors.

5. A modulation meter as set forth in claim 4 wherein said meter circuit comprises a meter having a O center scale for measuring variations on either side of zero and having first and second terminals bridged by a capacitor, said first terminal being connected through a variable resistor to the emitter of said first emitter follower transistor, said second terminal being connected through one side of a single-pole double-throw switch to a first resistor, said first resistor being connected to the emitter of said second emitter follower transistor and through a second resistor to another side of said switch, and a low impedance path between each of said emitters and a circuit common or ground.

6. A modulation meter as set forth in claim 5 wherein said indicating means further comprises a pair of output terminals coupled to said emitters for connection to an external recording circuit; and wherein said variable resistive control is connected in series between an output emitter of said receiving means and the input of said electronic switching means.

7. A modulation meter as set forth in claim 6 wherein said cascaded transistor stages of said switching means include first and second stages with a buffer stage as the output thereof; said buffer stage comprising a transistor having the emitter connected through a series connected pair of resistors to a circuit ground; said switching means output being connected at the junction between said resistors; and said buffer being conductive when said first stage is conductive.